United States Patent [19]

Ruscev et al.

[11] Patent Number: 4,785,168
[45] Date of Patent: Nov. 15, 1988

[54] DEVICE FOR DETECTING AND LOCALIZING NEUTRAL PARTICLES, AND APPLICATION THEREOF

[75] Inventors: Mario Ruscev, Issy les Moulineaux; Irene Dorion, Paris, both of France; Alain-Pierre Lilot, Liege, Belgium

[73] Assignee: Enertec, Montrouge, France

[21] Appl. No.: 934,975

[22] Filed: Nov. 25, 1986

[30] Foreign Application Priority Data

Dec. 4, 1985 [FR] France .................................. 85 17915

[51] Int. Cl.⁴ .......................... G01T 1/185; G01T 3/00
[52] U.S. Cl. .................................... 250/385.1; 250/390
[58] Field of Search .................. 250/374, 385, 390 A, 250/390 K

[56] References Cited

U.S. PATENT DOCUMENTS

| | | | |
|---|---|---|---|
| 4,176,280 | 11/1979 | Greschat et al. | 250/366 |
| 4,365,159 | 12/1982 | Young | 250/385 |
| 4,476,390 | 10/1984 | Hanawa | 250/385 |
| 4,492,869 | 1/1985 | Suzuki et al. | 250/486.1 |
| 4,599,740 | 7/1986 | Cable | 378/57 |

Primary Examiner—Carolyn E. Fields
Attorney, Agent, or Firm—Sanford J. Asman

[57] ABSTRACT

A device for detecting and localizing neutral particles such as X photons, gamma photons or neutrons is essentially constituted by a solid converter (2) disposed at a glancing incidence relative to the radication to be detected, together with networks of wires such as (3') disposed in the proximity of the converter. The device is applicable to industrial imaging.

33 Claims, 5 Drawing Sheets

DEVICE FOR DETECTING AND LOCALIZING NEUTRAL PARTICLES, AND APPLICATION THEREOF

The present invention relates to a device for detecting and localizing neutral particles such as X photons, gamma photons, or neutrons, the device comprising at least one sensor in the form of a gas-filled enclosure which is permeable to said neutral particles and which contains at least one converter capable of emitting ionizing particles under the impact of said neutral particles in order to give rise to charged particles by ionizing the gas, together with a detector member which is electrically polarized relative to said converter in such a manner as to attract said charged particles with sufficient force to give rise to an avalanche phenomenon.

BACKGROUND OF THE INVENTION

A prior art device of this type is described in British published patent application No. GB 2 000 632.

The simplest embodiments of devices for detecting neutral particles comprise an anode wire and a cathode which acts as a converter, with the anode wire and the cathode being disposed in the vicinity of each other, and with the assembly being contained in a gas-filled enclosure.

An example of a detector having this structure is described in the article at page 577 of "Review of Scientific Instruments", vol. 50, No. 5 (1979).

Regardless of the way in which such detectors operate, the function of the converter included therein is to emit ionizing particles under the impact of neutral particles, and more specifically to emit fast or "primary" electrons. The kinetic energy of such fast electrons is greater than the ionization energy of the atoms or molecules of the gas and is sometimes so high that these electrons cannot be effectively guided towards the anode by the electric field established inside the enclosure.

In contrast, by ionizing the gas these primary electrons create electron/positive ion pairs, and the electrons created in this way are referred to as "secondary electrons". The secondary electrons migrate towards the anode while the positive ions migrate towards the cathode.

An electric charge whose magnitude depends on the number of secondary electrons is thus collected at the anode. An appropriate circuit (or "channel") connected to the anode delivers a measurement signal proportional to the electric charge collected by the anode, and consequently representative of the energy or the intensity of the observed phenomenon.

In conventional manner, the collected charge may be detected either directly or indirectly. When detected indirectly, the electric charge is allowed to flow along a conductor and detection consists in detecting the resulting electric current.

Apart from these common characteristics, neutral particle detectors are very diverse, and are generally classified into two main types, depending on whether or not they make use of the "Townsend avalanche" phenomenon.

This phenomenon, which is well known to the person skilled in the art, appears when the electric field in the vicinity of the anode is sufficiently intense to accelerate the secondary electrons so that the kinetic energy which they acquire between two collisions becomes greater than the ionization energy of the atoms or the molecules of the gas.

Under these conditions, the secondary electrons may in turn create further secondary electrons which themselves participate in an avalanche phenomenon as they move towards the anode, with the avalanche ceasing only when all of the free electrons have been collected by the anode.

This multiplicative effect on the detected electrons gives rise to significant amplification of the measurement signal, e.g. by as much as $10^7$, thereby very substantially improving the signal/noise ratio.

Under good conditions, the number of secondary electrons can be maintained at a high value determined ratio to the number of primary electrons. Detectors operating under such conditions are called "proportional counters".

However, the multiplication factor of the avalanche phenomenon can only be controlled to a limited degree of accuracy, and in some applications it is preferable to provide detectors which do not make use of the avalanche phenomenon. This is true, in particular, of "ionization chamber" detectors and examples thereof are given in the above-mentioned article in "Review of Scientific Instruments", in British Pat. No. GB 1 578 325, and in French Pat. No. FR 2 503 381. These instruments generally detect radiation under metrological conditions so long as the charge accumulated on the anode is measurable, which requires the neutral particle radiation to be intense or the duration of measurement to be long.

That is why ionization chambers cannot be used in imaging, or in localizing particles, except under very special radiation conditions. In particular, they cannot be used except if the energy of the radiation to be detected is about 80 keV or rather less than said value. Further, the application of ionization chambers to imaging gives rise to complex devices, since each chamber provides only one point (or "pixel") of the image, as shown in French Pat. No. FR 2 503 381.

Avalanche detectors which are substantially better adapted than ionization chambers to such applications are well known to the person skilled in the art of imaging or in the art of localizing particles.

An example of a proportional counter applied to two-dimensional image acquisition is given in the article on page 157 of "IEEE Transactions on Nuclear Science", vol. 27, No. 1 (February 1980).

This detector comprises a two-dimensional network of anode wires associated with bundles of lead oxide crystal tubes acting as converters and disposed perpendicularly to the plane of the anode network. The angle of incidence of the neutral praticle radiation on the detector is close to 90° and the conversion efficiency of the detector is fairly independent of the angle of incidence and remains less than 8%.

Another proportional counter for direct acquisition of two-dimensional images is described in British Pat. No. 2 000 632. This device, like the above device, belongs to the class of apparatuses known as multi-wire proportional chambers and is intended for detecting radiation impinging thereon at an incidence perpendicular to its plane. It comprises two cathodes in the form of strips and constituting solid converters together with an anode constituted by a plane of wires which are electrically interconnected.

The strips of cathodes are associated with delay lines which are in turn connected to a time analysis circuit.

Other than the fact that this detector requires a complex analysis circuit, and the fact that its conversion efficiency cannot be very high, it necessarily leads to rather long image acquisition times, thereby limiting its application to the formation of quasi-static images, for example to scintigraphy.

In this context, the essential aim of the invention is to provide a device for detecting and localizing neutral particles, said device being substantially more efficient than prior multi-wire proportional chambers, in particularly when the energy of the neutral particles is substantially greater than 50 keV.

SUMMARY OF THE INVENTION

The present invention provides a device for detecting and localizing neutral particles such as X photons, gamma photons, or neutrons, the device comprising at least one sensor in the form of a gas-filled enclosure which is permeable to said neutral particles and which contains at least one converter capable of emitting ionizing particles under the impact of said neutral particles in order to give rise to charged particles by ionizing the gas, together with a detector member which is electrically polarized relative to said converter in such a manner as to attract said charged particles with sufficient force to give rise to an avalanche phenomenon, the device including the improvements whereby the particles propagating relative to said sensor follow a determined average direction, the converter comprises a plate of solid material at a angle of less than 10° to said average particle propagation direction, and said detector member comprises a network of electrically conductive elongate detector elements which are substantially parallel to one another and to the plate of the converter, and which are connected to circuits for forming a one-dimensional image corresponding to the distribution of neutral particle intensity along a direction perpendicular to the projection on the plane of the converter plate of said average direction of particle propagation.

Although, a priori the plate constituting the converter may be plane, warped, dished or corrugated in shape, a plane shape is generally most suitable.

One of the essential novel features of the invention lies in the fact that it provides a sensor which, while being simple in structure and suitable for industrial manufacture, never-the-less combines the qualities of proportional chambers and the advantages of a solid converter for application to localizing particles. The advantages of a solid converter include those known prior to the invention and those shown up by the invention, and they are related to the use of a glancing incidence.

In the past, the person skilled in the arts of imaging and of localizing particles has been in the habit either of associating each pixel of an image with a specific detector of the ionization chamber type, as shown by French Pat. No. FR 2 503 381 and British Pat. No. GB 1 578 325, or else of forming an image in a plane substantially perpendicular to the direction of propagation of particles to be localized by associating each anode wire or strip to an entire row (line or column) of image pixels, as shown in British Pat. No. GB 2 000 632 and the above-specified article in the journal "IEEE Transactions on Nuclear Science". In contrast, the present invention proposes using an avalanche detector to form an image in a plane at a glancing incidence relative to the direction of particle propagation, and associating a row of pixels with an entire set of elongate detector elements (wires or strips).

The resolution of the detector in accordance with the invention is optimal if the elongate detector elements are wires which are electrically insulated from one another and extend taut parallel to the projection on the plane of the converter of the average direction of particle propagation.

Each wire is then connected to a separate electronic charge detection circuit (or channel) with the one-dimensional image being formed by the set of output signals from said circuits.

These electronic circuits (or channels) are known per se and may, for example, be of the type used with multi-wire proportional chambers.

Good results may be obtained in the detection of X photons or gamma photons when the converter contains a material whose atomic number is not less than 25.

It is also advantageous, in particular for detecting neutrons, for the converter to contain a material having an effective interaction section with neutral particles of not less than one millibarn, where a barn is equal to $10^{-24}$ cm$^2$.

Of the materials that may be used, the converter preferably contains a material selected from the group constituted by: tungsten, tantalum, lead, cadmium, gadolinium, boron, samarium, europium, lithium, dysprosium, rhodium, beryllium, carbon, gold, silver, lanthanum, depleted uranium, platinum, thalium, niobium, molybdenum, nickel, copper, cobalt, iron, iridium, mercury, indium, manganese, hydrogen, deuterium, nitrogen, oxygen, and chlorine.

By way of more precise example, the converter may be not more than 2 millimeters thick and may have at least some points on one of its faces making an angle of not more than 5° with the average direction of propagation of the neutral particles.

For photons having an energy of 400 keV for example, the converter may be a plate of tantalum having a thickness of not more than 200 microns and having at least some points on one of its faces making an angle of not more than 2° with the average direction of neutral particle propagation.

The detector member may be constituted by single strips of appropriate width if the device is used in low count rate applications and is used in PPAC (parallel plate avalanche counter) mode or in pseudo-PPAC mode, i.e. if it is not used in proportional mode.

When maximum image definition is not required, the elongate detector elements may be constituted by an electrically conductive material of fairly high resistance, in which case these elements are stretched parallel to the plane of the converter plate and are disposed perpendicularly to the projection on the plane of said plate of the average propagation direction of the neutral particles. In this case the elements are electrically connected to each other at each end and the ends are themselves connected to an electronic channel for detecting charge. With such an assembly, neutral particles are localized along the detector elements by virtue of the way the current produced by the collected charges is distributed between the two electronic channels.

For example, the distance between pairs of adjacent wires and the distance between each wire and the converter may be less than 15 millimeters.

The efficiency of the device is further improved if it is provided with an additional plane electrode raised to substantially the same electrical potential as the converter and disposed parallel thereto but on the other side of the network of wires, and if the detector member includes a network of wires and an additional electrode on each side of the converter.

This arrangement extracts even greater advantage from the glancing incidence disposition of the converter relative to the direction of particle propagation. This arrangement makes it possible to use a very thin converter thereby making it highly probable that primary electrons will also be emitted from the surface of the converter which is not directly subjected to neutral particle radiation. The additional secondary electrons created by such primary electrons are also collected.

In order to control the operating parameters of the device (which parameters are greatly influenced by the nature of the medium separating the converter from the detector member), the enclosure enclosing the converter and the detector member is at least partially filled with an inert gas.

The pressure of the gas in this enclosure is preferably less than $10^6$ pascals, and the electrical potential difference between the detector member and the converter is preferably less than 30 kV.

Advantageously, the device includes a bracket holding the converter and the detector member at an angle to a reference axis related to the external shape of the enclosure, with said angle being suitable for obtaining the desired orientation of the converter relative to the average direction of neutral particle propagation when said reference axis is itself directly pointed in said direction.

The advantages of a device in accordance with the invention for detecting and localizing neutral particles are particularly apparent when the device is applied to imaging, i.e. when it is used for obtaining an image or at least a partial image of a body.

When a body is irradiated by a source of neutral particles, the radiation passing through the body is attenuated as a function of the nature of the material through which the radiation passes and of the mass of said material, thereby giving rise to a corresponding spatial intensity distribution which can be revealed by a sensor of the kind described above.

In such applications, a device in accordance with the invention thus generally comprises at least one source of neutral particles which is located at a distance from the sensor(s), with the sensor(s) being oriented to take the direction of the axis between the sensor(s) and the source as the average direction of neutral particle propagation.

The device then preferably includes at least one neutral particle collimator associated with a corresponding sensor, said collimator having a slot for restricting the beam of particles received from the source to a flat beam centered on the average direction of propagation and intersecting the plane of the sensor converter in a direction substantially perpendicular to said average direction of propagation.

The device may include a frame on which a plurality of sensors are mounted.

In this case, the sensors are advantageously disposed in a staggered arrangement on the frame so that their respective converters, when considered as a whole, overlap sufficiently to entirely intercept the flat beam of neutral particles coming from the source.

Also, the frame is preferably enveloping in shape, for example L-shaped, U-shaped, or arcuate, with the source being disposed at a distance from the frame but within its enveloping shape.

The device may include a plurality of sources of neutral particles or a source capable of being placed in a plurality of different positions. In this case, the sensors may be rotatably mounted on the frame so as to be pointable to one or other of the sources of neutral particles or to one or other of the possible positions for a single source.

The sensor may be provided with a converter having an area of substantially more than 500 cm$^2$ associated with two networks of wires extending along two orthogonal directions, so as to be able to provide a two-dimensional image of an irradiated body using the above-described electrostatic induction technique.

Also, the device may comprise a stack of planes constituted by alternating converters and detector members.

These planes are parallel to one another and are placed as described above at a glancing incidence relative to the direction of neutral particle propagation.

As mentioned above, each detector member may comprise a series of N conductive strips (or individually-insulated wires) extending parallel to the projection, on the plane of the corresponding converter of the average propagation direction of the neutral particles. If the device comprises M detector members, it is suitable for giving a two-dimensional image of an irradiated body corresponding to a matrix of N×M elements.

However, since the geometry of the sensor described above is better adapted to making one-dimensional images, a simpler solution for obtaining a two-dimensional image of a body of considerable size and/or volume (e.g. several tens of cubic meters) consists in forming an image of a section of the body to be examined, in scanning the body to be examined, i.e. forming successive images of successive sections, and in recording the various images obtained over a period of time. Such a technique is conventional in imaging.

In this case, the body may be moved relative to the sensor or to the source, or preferably relative to both the sensor and the source.

A device in accordance with the invention can be used to obtain an image of a dense object presenting a thickness of more than one centimeter of metal to the passage of neutral particles, and it may be used with bodies of iron or steel presenting a thickness of up to about 60 centimeters.

The device can thus be used for making images of dense and bulky objects such as containers.

In this type of application, it is convenient to use X photons or gamma photons. Their energy is equal to not less than 50 keV, for example, and preferably lies in the range 250 keV to 2 MeV, and is typically about 350 keV to 750 keV.

There are numerous advantages to a device in accordance with the invention.

The sensor efficiency is very high, and is about 30% with radiation of 400 keV, thereby making it possible to obtain a highly-contrasted image of an examined object.

Also, by virtue of this high efficiency, it is not necessary to make use of very energetic radiation, even when forming images of dense and bulky objects as mentioned above. As a result the precautions which need to be taken to provide protection again radiation remain moderate and the sources themselves, i.e. typically X-ray generators, remain reasonable in volume and expense. The angle of emission of the X-rays emitted by these generators remains fairly large and this makes it possible to irradiate a relatively bulky object in a relatively small space, i.e. in an installation or a building of relatively small size.

BRIEF DESCRIPTION OF THE DRAWINGS

Embodiments of the invention, and more particularly embodiments adapted to detecting photons, are described below by way of example with reference to the accompanying drawings, in which.

MORE DETAILED DESCRIPTION

The invention relates to a device comprising at least one sensor 1 (shown fully in FIG. 3) including a converter 2 (see FIG. 1) and a detector member which is itself built up from a plurality of elements 3, 3', 4, 4', described below.

The sensor is intended to detect and to localize neutral particles irradiating it, such as X photons, gamma photons, or neutrons. The average direction of propagation of these particles as symbolized in FIG. 1 by a wavy line, is assumed to be substantially fixed relative to the sensor, at least during detection. The particles are assumed to be propagating in a sheet perpendicular to the plane of FIG. 1 with the sheet cutting the plane of the figure substantially along the wavy line.

Figure 1:
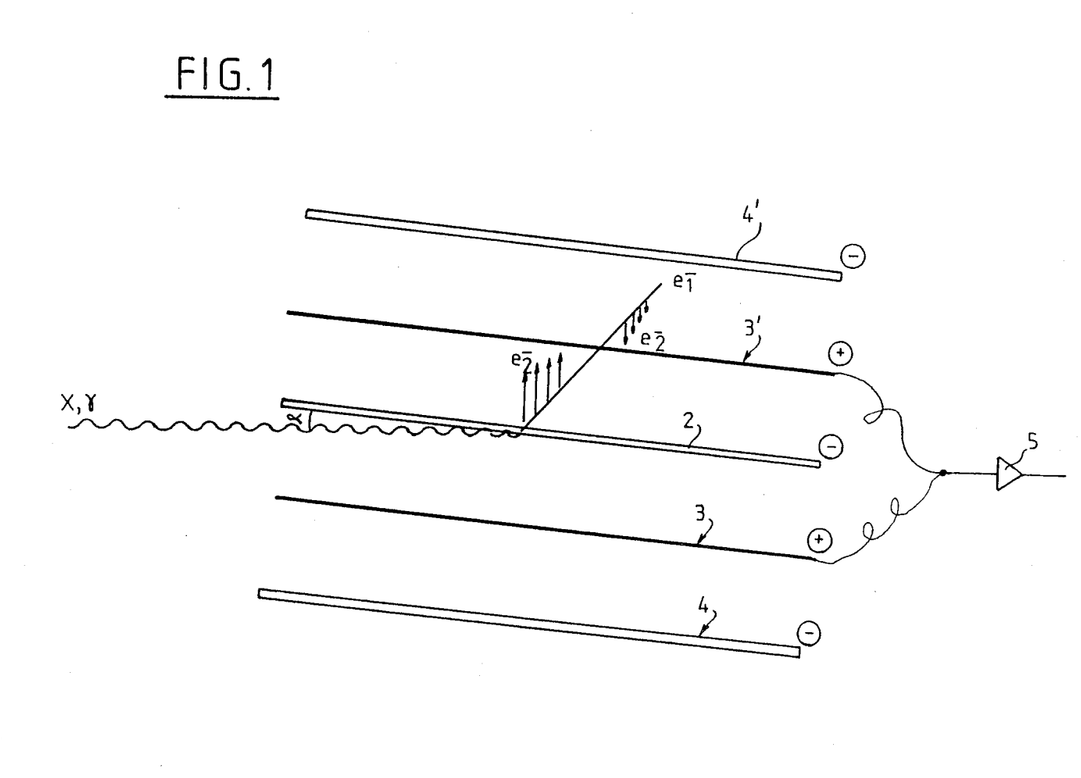
FIG. 1 is a diagrammatic fragmentary section through a sensor used in a device in accordance with the invention, with this view being used to illustrate the principle of sensor operation.
Figure 3:
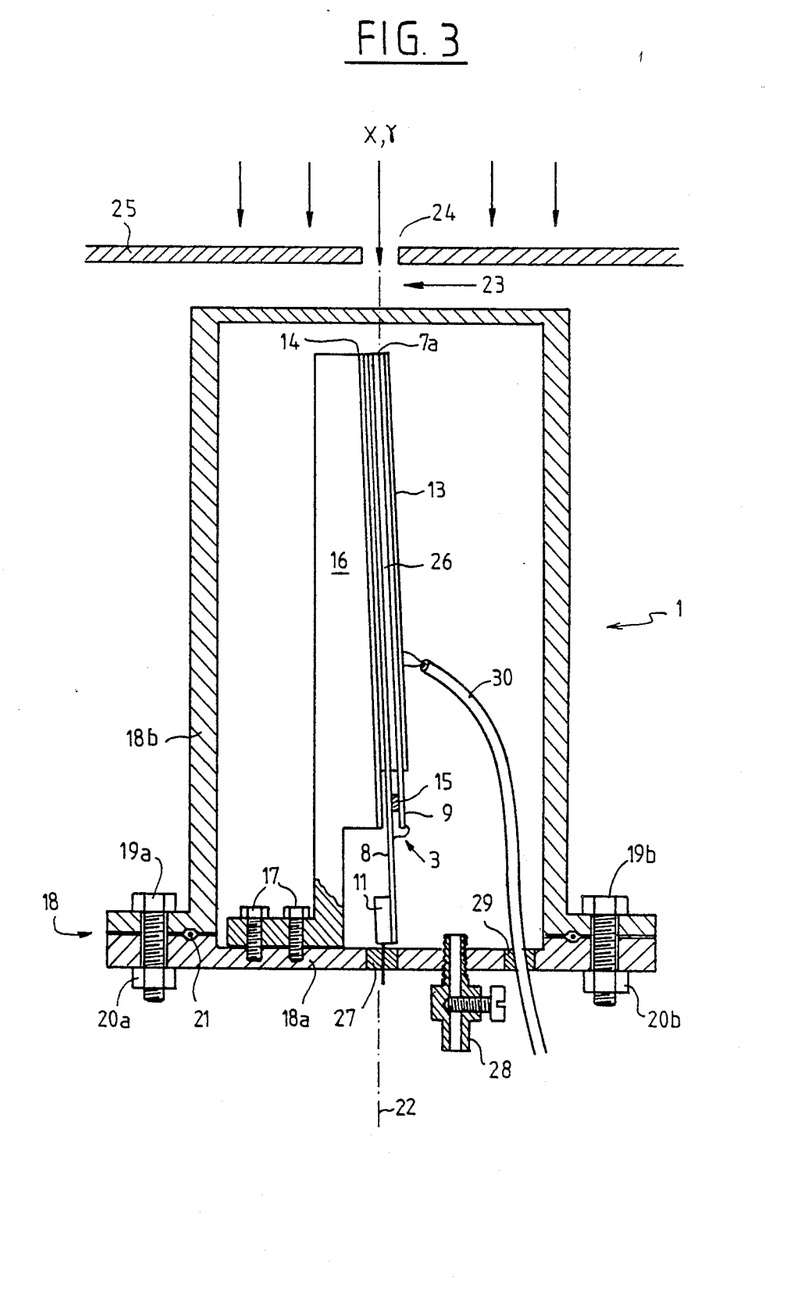
FIG. 3 is a section through an entire sensor.

The converter 2 is a plate of high atomic number material, for example tantalum, disposed at a glancing incidence relative to the direction of propagation of the neutral particles. Thus, by way of example, the angle alpha between said plate and said direction may be equal to 1°. In FIGS. 1 and 3 the converter is assumed to extend in a plane perpendicular to the plane of the figures.

Figure 2:
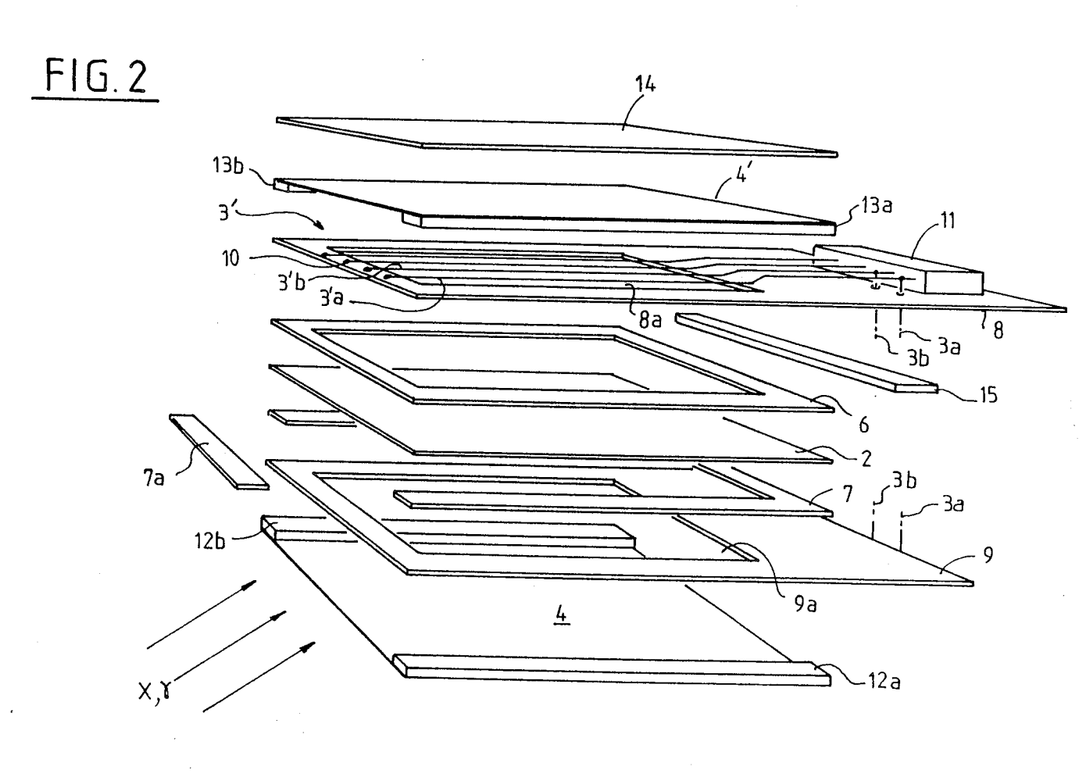
FIG. 2 is a fragmentary exploded view of the sensor.

For example, the converter may be 30 centimeters long (the longest dimension visible in FIGS. 1 and 3), 16 centimeters wide (the dimension which is perpendicular or practically perpendicular to the plane of each of FIGS. 1 to 3), and 70 microns thick.

Although not essential, it is convenient to use a converter which is plane. If the plate constituting the converter is not sufficiently rigid, it may be glued to a rigid support but this gives rise to a loss of efficiency of about 20% to about 50%, given that electrons are no longer detected in one of the two half spaces.

As shown in FIG. 1, the smaller the angle alpha, the greater the distance that an incident particle must travel through the converter for a given thickness of converter.

For an angle alpha of 1° and a converter thickness of 70 microns, this distance is about 4000 microns, i.e. 4 mm.

On either side of the converter 2 there is a respective network of conductive wires 3 and 3', each raised to an electric potential which is different from the potential to which the converter 2 is raised.

For example, the networks of wires 3 and 3' may be at ground potential while the converter is raised to a negative potential of 2 kV to 3 kV.

The converter responds to the impact of an incident neutral particle by virtue of the photoelectric effect, or the Compton effect, or by pair creation, to liberate at least one high-energy primary electron $e^-_1$ capable of ionizing the gas and creating electron/ion pairs. The secondary electrons $e^-_2$ created in this way are attracted, by virtue of their electric charge, towards one or other of the two networks of wires 3 and 3', and in turn they create further secondary electrons $e^-_2$.

In the terminology applicable to the art, the charged particles, and in particular the secondary electrons collected on the anode, are frequently referred to as "charges".

While the angle alpha between the incident particles and the converter 2 is small, the angle of emission of the electrons $e^-_1$ relative to the converter, may be large, and practically equal to 90°, so that the path which these electrons have to follow inside the converter before being removed therefrom is very short relative to the 4 millimeters of virtual thickness which the converter offers to the incident radiation.

The networks of anode wires 3 and 3' enable the signal to be amplified by multiplying the charges due to the Townsend avalanche phenomenon, and they also serve to localize a charge received in this way. The wires are situated on either side of the converter 2 and extend in planes parallel thereto, i.e. in respective planes perpendicular to the plane of FIG. 1.

The wires in the two networks 3 and 3' are also parallel to the projection onto the plane of the plate 2 of the average direction of propagation of the neutral particles. Since this average direction corresponds in FIG. 1 to the direction of the wavy line, the projection of this direction onto the plate 2 coincides in FIG. 1 with the bottom edge of the highly elongate rectangle representing the right cross-section of said plate, and the wires of the two networks 3 and 3' extend parallel to said projection.

All of the wires in the networks 3 and 3' are raised to the same electric potential, however each wire in each network is electrically insulated from all the other wires of the same network. In contrast, each wire of each network may (as shown in FIG. 1) be connected to the wire of the other network which occupies a symmetrical position relative to the plane of the converter in order to constitute a pair of detector wires therewith. Each of these pairs of detector wires in the networks 3 and 3' is connected to a separate electronic detector channel which is symbolized by an amplifier 5. Each channel amplifies the electric current corresponding to the charges $e^-$ collected on the pairs of wires with which it is associated. Thus, the set of electronic channels deliver a set of electrical signals representative of an image of the intensity distribution of the neutral particles in a direction perpendicular to the plane of FIG. 1.

These signals are used, as is well known to the person skilled in the art, to provide a final video image.

The sensor detector member also comprises two additional plane electrodes 4 and 4' which are disposed parallel to the converter 2 and the networks 3 and 3' and on the opposite sides of the networks 3 and 3' from the converter. These additional electrodes are raised to the same potential as the converter, i.e. in the present case to a negative potential of 2 kV to 3 kV.

Although not essential, these additional electrodes provide improved multiplication and improved charge collection, and they also cancel the electrostatic forces acting on the anode wires of the networks 3 and 3' which would otherwise curve the wires and thus alter the behavior of the sensor.

FIG. 2 gives a better three-dimensional representation of the overall structure of the converter/detector member assembly.

FIG. 2 shows the converter 2 in the middle, and in the embodiment shown the converter is constituted by a tantalum plate having the dimensions 30 cm×16 cm×70 micrometers.

This plate is stretched between two rectangular frames of stainless steel 6 and 7 each of which 1.5 mm thick.

The frame 7, which is the lower frame in FIG. 2, is missing the edge on the side of the converter which receives the neutral particle radiation, as symbolized by arrows. This edge is replaced by an elongate element 7a made of a material which is more permeable to neutral particles than is steel, for example it may be made of glass fiber reinforced epoxy resin.

On either side of assembly 2-6-7-7a constituted by the converter and its frames, there are two plates 8 and 9 which support anode wires such as 3a which constitute the networks 3 and 3'. For the purposes of clarifying the drawing, the network 3 has not been shown in FIG. 2.

These plates 8 and 9 are longer than the frames 6 and 7 and are made of a rigid insulating material which is permeable to the neutral particles. Glass fiber reinforced epoxy resin plates of the kind generally used for printed circuit cards are perfectly suitable.

Each of these plates 8 and 9 is 1.5 mm thick and is pierced by a corresponding window 8a or 9a which is smaller in size than the frames 6 and 7.

The anode wires such as 3'a of the network 3' are stretched over the top surface (as shown in FIG. 2) of the plate 8 above the window 8a.

These wires may be made of stainless steel or gold-plated tungsten, for example, and they are about 50 micrometers in diameter. They are thus stretched parallel to one another with the distance between pairs of adjacent wires being about 2.5 mm, for example.

These wires are fixed to the plate 8 by any suitable means, for example by spot welds 10.

These wires are electrically insulated from one another by virtue of the very high resistivity of the plate 8 and they are independently connected to separate connection cells in a connector 11 fixed to the end of the plate 8.

The two wires extending along respective edges of the window 8a are of greater diameter than the other wires, for example they may be 70 microns in diameter, and they are not connected to the connector 11. This feature is not specifically shown in FIG. 2 for reasons for clarity, but serves to provide a uniform electric field for all of the anode wires actually connected to the connector 11.

The network of wires 3 on the plate 9 is made in an entirely similar manner and is disposed symmetrically about the plane of the converter 2.

In other words, with reference to the disposition in FIG. 2, the wires of the network 3 are stretched over the hidden face of the plate 9.

The only difference lies in the connections to the networks of wires 3 and 3'.

For example, as shown in FIG. 2, the plate 9 is shorter than the plate 8 and wires such as 3a, and 3b, of the network 3 are separately connected to the wires 3'a, 3'b of the network 3' which occupy symmetrical positions about the plane of the converter 2 in the vicinity of the point where said wires of the network 3' are connected to the connector 11. Thus, although the connector 11 is mounted on the plate 8, it also serves to provide connections to the wires of the network 3 mounted on the plate 9.

The additional plane electrodes 4 and 4' are symmetrically disposed on either side of the above-described assembly 2-6-7-8-9 at a distance from the corresponding networks 3 and 3' which is set to 3 mm by thickness spacer members 12a, 12b, 13a, and 13b.

The additional electrodes may be made of stainless steel plates, for example and they are also referred to as "cathodes" because of their negative electrical bias, one of whose functions is to return electrons torn from the converter back towards the anode wires of the networks 3 and 3'.

Above the cathode 4' (as shown in FIG. 2) there is an insulating plate 14 whose insulating function is more readily understood with reference to FIG. 3.

Finally, a spacer 15 is disposed between the plates 8 and 9 in order to prevent any relative movement between said plates.

The stack described with reference to FIG. 2 is assembled by any suitable means, for example by a NYLON screw passing through the stacked elements and clamping them together.

The completed assembly is mounted on a bracket 16 (see FIG. 3) with the plate 14 insulating the cathode from the bracket in case the bracket is made of metal.

The bracket 16 is fixed by any suitable means, for example bolts 17 to the base 18a of a gas-tight enclosure 18.

The enclosure 18 is essentially constituted by a rectangular box 18b which is fixed to the base 18a by means of suitable members such as bolts 19a, 19b and nuts 20a, 20b with a sealing gasket 21 ensuring that the enclosure is indeed gas-tight.

The enclosure is made of a material which is permeable to neutral particles and which is mechanically strong, e.g. aluminum.

In FIG. 3, reference 22 designates the longitudinal axis of symmetry of the external rectangular shape of the enclosure 18.

The lines where this axis passes through the base 18a and the facing end of the box 18b are readily determined by simple length measurements.

In order to orient the converter properly relative to incident radiation, when the converter is no longer visible because it is enclosed inside the enclosure 18, the bracket 16 holds the converter 2 at a specific orientation relative to the reference axis 22, and this orientation corresponds to the desired inclination of the converter relative to the average direction of neutral particle propagation.

In other words, the bearing surface provided on the bracket 16 for the stack described with reference to FIG. 2 should make an angle alpha of 1° with the axis 22 so that the converter 2 can be properly oriented about an axis perpendicular to the plane of FIG. 2 by aligning said axis 22 with the average direction of particle propagation.

The enclosure 18 can then be oriented by rotation about the axis 22 so that the front edge of the converter 2 adjacent the frame element 7a is parallel to the average plane of a flat beam 23 of incident particles. This average plane and the front edge of the converter are then perpendicular to the plane of FIG. 3.

The flat beam 23 of neutral particles is defined by a long slot 24 of a collimator 25, which may be constituted by lead shielding, for example, with said slot being 5 mm wide and 16 cm long. In FIG. 3, the long direction of the slot 24 is perpendicular to the plane of the figure, and the line where the average plane of the flat beam 23 cuts the converter 2 is a line 26 which is perpendicular to the plane of FIG. 3 and is situated above halfway along the converter.

The base 18a of the enclosure 18 includes a multi-pin connection 27 using gas-tight feed-throughs for the pins. Each connection cell of the connector 11 is connected to one of the pins of the connector 27 inside enclosure 18, and outside the enclosure each pin is connected to the corresponding electronic processing channel.

The base 18a also includes a valve 28 for filling the enclosure to a desired pressure with a suitable gas.

The gas selected should be an inert gas such as argon together with traces of a polyatomic molecule such as isobutane, ethane, alcohol vapor, methylal, or a mixture of alcohol and carbon dioxide.

The pressure is adjusted to a value lying in the range $5.10^3$ and $10^6$ pascals, and in the specific embodiment described it is adjusted to $10^5$ pascals.

In order to avoid consequences due to the gas ageing, it is also possible to provide two openings into the enclosure, both similar to the valve 28, so as to provide continuous flow and/or renewal of the gas in the enclosure.

Finally, the base 18a includes another sealed feed-through 29 for an electric cable 30.

This cable is externally insulated and serves to connect the converter 2 and cathodes 4 and 4' to a negative electrical bias potential of about 2 kV to about 3 kV in the present example.

The electrical conductors of this cable are connected, for example, to side connectors (not shown) on the converter and the cathodes.

The bias potential selected depends on the distance between the anode wires of the networks 3 and 3' and the converter 2, on the gas pressure inside the enclosure, on the desired amplificaton factor for the Townsend avalanches, and on the diameter of the anode wires. The selected voltage is advantageously about one volt per millimeter per torr (where 1 torr is approximately equal to $1.3 \times 10^2$ pascals).

Figure 4:
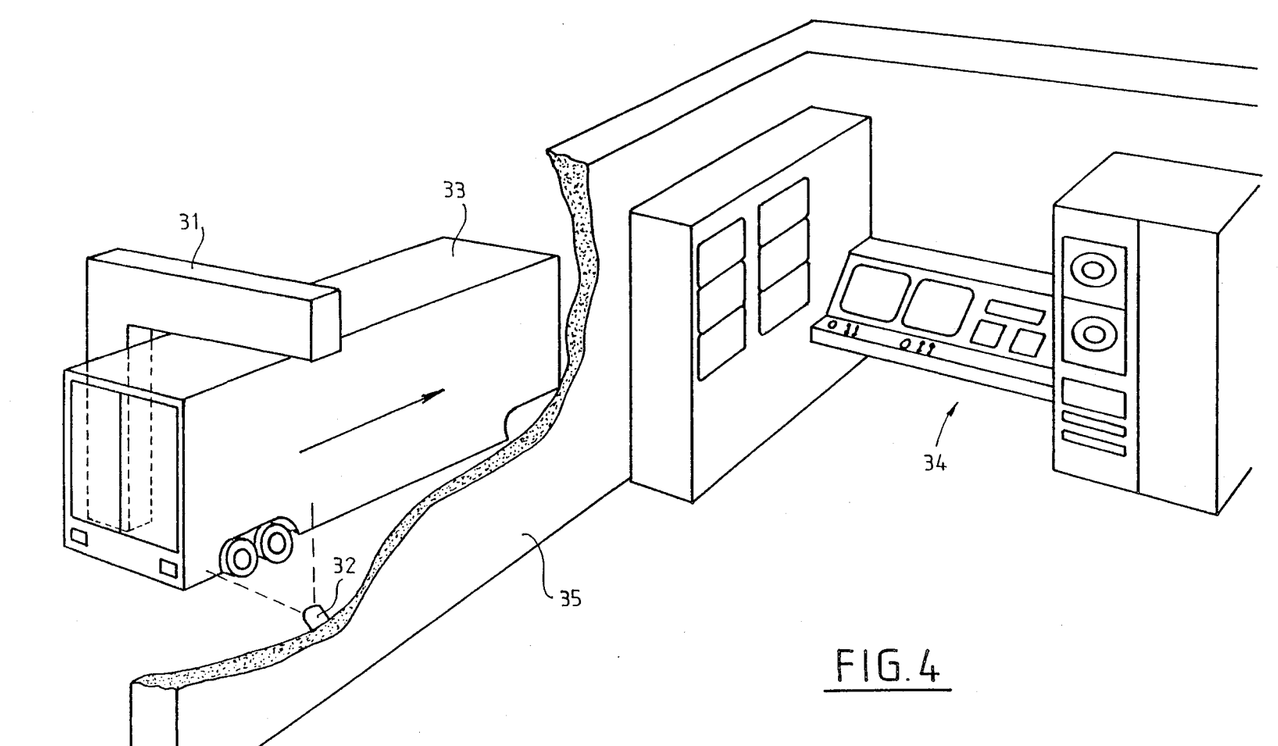
FIG. 4 is a partially-cutaway perspective view of an industrial imaging installation using a device in accordance with the invention.

FIG. 4 shows an installation using a device in accordance with the invention.

Figure 5A:
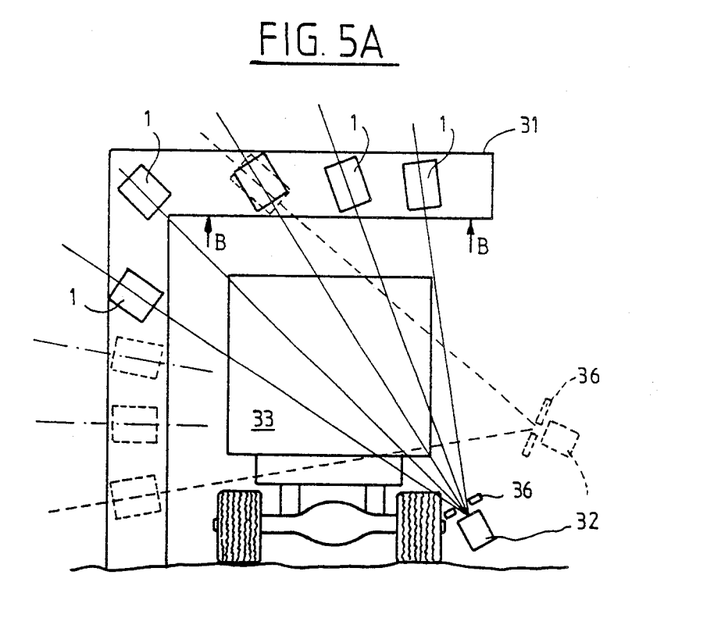
FIGS. 5a and 5b show details of the FIG. 4 installation.

The device comprises a frame 31 having a plurality of sensors such as the sensor shown in FIG. 3 mounted thereon, for example it may have about thirty sensors (see FIG. 5A).

A source 32 of neutral particles, for example an X-ray generator, a linear accelerator, or an isotope source (e.g. cobalt 60) is disposed at a distance from the frame 31 so as to emit particles towards the sensors or at least towards some of them.

The frame 31 is of an enveloping shape, for example it may be L-shaped or semicircular, with the distance between the frame and the source being as much as several meters so as to allow a relatively large object such as a trailer or a container 33 to be interposed between the source and the sensors. The object is assumed to be travelling at constant speed in the direction of the arrow.

An imaging installation 34 protected from the source 32 via a wall 35 receives a current signal from each of the connector pins 27 on each of the sensors 1 mounted on the frame 31, which signals may optionally be preamplified by amplifiers such as the amplifier 5. These signals are representative of the intensity of neutral particle radiation as detected by pairs of anode wires such as 3a and 3'a connected to the corresponding pins after the radiation has passed through the object 33.

Each of these signals is thus representative of the degree to which radiation from the source is absorbed by the object 33 under examination along a highly accurate direction, and are therefore representative of the nature and the mass of the material through which radiation has passed.

The current signals are individually integrated over a short time interval, for example 20 ms, and are then converted into digital samples which are stored in a memory. The digital samples relating to the same integration period thus correspond to an image of the section of the object 33 which was being irradiated during said period. The set of stored digital samples corresponding to the set of integration periods which elapse as the complete object 33 passes through the installation can thus be used by conventional techniques to reconstitute a two-dimensional image of the object.

In practice, it may be advantageous, as shown in FIG. 5A, to take two images of the object 33 so as to cover all angles and also as to obtain a stereoscopic image.

This may be done by displacing the source 32 between taking two images (or by using a first source and a second source) and by pointing the sensors towards the appropriate source on each occasion.

To this end, the sensors 1 may be rotatably mounted on the frame about an axis perpendicular to the plane of FIG. 5A so as to be able to point to one or other of the two possible source positions.

FIG. 5A shows a detail at 36 which is omitted from FIG. 4 for reasons of clarity.

The reference 36 designates a collimator, for example a lead plate having a slot which is elongate in the plane of FIG. 5A so as to limit the emission of neutral particles to a flat beam whose average plane corresponds to the average plane of the frame and is parallel to the plane of FIG. 5A, and whose thickness is much the same as the thickness of the frame 31.

Figure 5B:
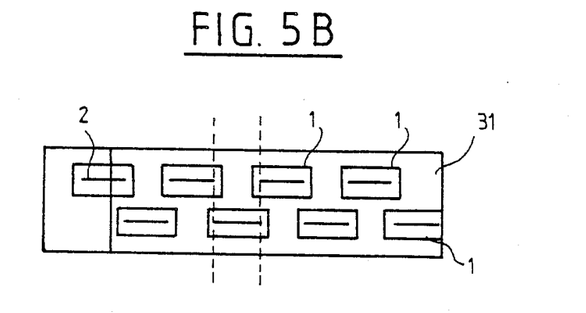

FIG. 5B is a view along arrows BB of FIG. 5A.

This figures shows a solution to a problem which arises when implementing the imaging method illustrated in FIG. 5A.

It is unavoidable that each sensor should extend further in a direction perpendicular to the plane of FIG. 3 than the width of the converter inside the sensor. As a result it is impossible to dispose the sensors along a single row (from right to left in FIG. 5B) and to intercept the entire flat beam emitted by the source 32 and the collimator 36 over its entire extent in its average plane.

This problem is solved by disposing the sensors 1 in a staggered arrangement on the frame as shown in FIG. 5B.

Using a tantalum converter having a thickness of 100 microns, a converter to anode wire distance of 2.5 mm, a source to sensor distance of 3 m, and an X-ray generator operating at 400 keV and at 10 mA, an intervening 4 cm of steel between the source and the sensor leads to a current of about $6.10^{-6}A$ on the anode wires and an intervening 14 cm of steel leads to a current of about $3.10^{-9}A$.

As will be readily apparent to the person skilled in the art, applications for a device accordance with the invention are numerous and are not limited to the applications specifically illustrated in FIGS. 4 and 5.

In particular, the invention may also be used in X-ray, gamma ray, neutron or positron emission tomography and scintigraphy.

In any event, the very high efficiency of a sensor in accordance with the invention makes it possible to obtain a good image without using a high dose of radiation.

The invention may also be used in applications for which no scanning is necessary, for example for obtaining a one-dimensional X-ray diffraction image.

We claim:

1. A device for detecting and localizing neutral particles comprising:
   at least one sensor in the form of a gas-filled enclosure which is permeable to said neutral particles and which contains at least one converter capable of emitting ionizing particles under the impact of said neutral particles in order to give rise to charged particles by ionizing the gas, together with detecting means comprising charge multiplication means which are electrically polarized relative to said converter in such a manner as to attract said charged particles with sufficient force to give rise to an avalanche phenomenon, the device including the improvement wherein the particles propagating relative to said sensor following a predetermined average direction and the converter comprises a plate of solid material at an angle of less than 10° to said average direction and wherein said detecting means comprise a network of electrically conductive elongate charge collecting means which are substantially parallel to one another and to the plate of the converter, and which are connected to circuits for forming a one-dimensional image corresponding to the distribution of neutral particle intensity along a direction perpendicular to the projection on the plane of the converter plate of said average direction of particle propagation.

2. A device according to claim 1, characterized in that the elongate charge collecting means are wires which are electrically insulated from one another and which are held taut parallel to the projection on the plate of the converter of said average direction.

3. A device according to claim 1, characterized in that the converter contains a material having an atomic number not less than 25.

4. A device according to claim 1, wherein the converter contains a material having a effective interaction section with the neutral particles of not less than 1 millibarn.

5. A device according to claim 1, wherein the converter has a thickness of not more than 2 millimeters and is at an angle of not more than 5° to the average direction of neutral particle propagation.

6. A device according to claim 1, characterized in that the converter is a plate of tantalum having a thickness of not more than 200 microns at an angle of not more than 2° to the average direction of neutral particle propagation.

7. A device according to claim 2, wherein the distance between two adjacent wires and the distance between each wire and the converter are less than 15 millimeters.

8. A device according to claim 2, characterized in that the detecting means further comprise at least one additional plane electrode raised to substantially the same electrical potential as the converter and disposed parallel thereto on the opposite side of the network of wires.

9. A device according to claim 8, wherein the detecting means comprise a network of wires and an additional electrode on each side of the converter.

10. A device according to claim 1, wherein the gas pressure in the enclosure is less than $10^6$ pascals.

11. A device according to claim 10, wherein means are provided for applying an electrical potential difference between the charge multiplication means and the converter of less than 30 kV.

12. A device according to claim 1, further comprising:
   a bracket holding the converter and the detecting means at an inclination which, relative to a reference axis related to the outside shape of the enclosure, facilitates a desired orientation of the converter relative to the average direction of neutral particle propagation by pointing said reference axis in said direction.

13. A device according to claim 1, wherein means are provided for orienting the sensor to conform to an assumption that the average direction of neutral particle propagation is the direction of the axis between the sensor and a source of neutral particles locatable at a distance from the sensor.

14. A device according to claim 13, further comprising:
   at least one neutral particle collimator associated with a correspnding sensor, said collimator having a slot for restricting the beam of particles as received from the source to a flat beam centered on said average direction of propagation, which flat beam meets the plane of the converter of said corresponding sensor substantially perpendicularly to said average direction of propagation.

15. A device according to claim 13, characterized in that the source is a source of one kind of neutral particles, selected from a group consisting of X-ray photons and gamma photons having an energy of not less than 50 keV.

16. A device according to claim 13, further comprising:
   a frame to which a plurality of sensors are mounted.

17. A device according to claim 16, characterized in that the sensors are disposed in a staggered configuration on the frame so that their respective converters when considered as a whole entirely intercept a flat beam of neutral particles propagating from the source.

18. A device according to claim 16, characterized in that the frame is enveloping and has a shape selected from a group of shapes including L-shaped, U-shaped, and arcuate, with the source being disposed at a distance from the frame inside said enveloping shape.

19. A device according to claim 16, characterized in that the sensors are rotatably mounted on the frame so as to be able to point at more than one source of neutral particles.

20. A device according to claim 16, characterized in that the sensors are rotatably mounted on the frame so as to be able to point at more than one position of a single source.

21. A device according to claim 2, wherein:

the converter contains a material having an effective interaction section with the neutral particles of not less than 1 millibarn.

22. A device according to claim 2, wherein:
the converter has a thickness of not more than 2 millimeters and is at an angle of not more than 5° to the average direction of neutral particle propagation.

23. A device according to claim 2, wherein:
the converter is a plate of tantalum having a thickness of not more than 200 microns at an angle of not more than 2° to the average direction of neutral particle propagation.

24. A method of detecting and localizing neutral particles, comprising the steps of:
propagating a flow of said neutral particles from a source thereof along a predetermined average direction;
receiving a portion of said flow of neutral particles at a gas-filled sensor containing a converter plate inclined at less than 10° to said average direction and emitting from said converter a corresponding flow of ionizing particles to generate charged particles of ionized gas;
amplifying said flow of charged particles by charge multiplication means which are electrically polarized relative to said converter plate to attract said charged particles with sufficient force to give rise to an avalanche phenomenon; and
detecting a distribution of charged particles along a direction perpendicular to a projection on a plane of said converter plate of an average direction of propagation of said neutral particles and generating a corresponding signal representative of a distribution of neutral particle intensity along said perpendicular direction.

25. The method of claim 24, wherein:
said flow of neutral particles is irradiated from said source through a body prior to being received at said sensor.

26. The method of claim 25 including the steps of:
processing said signal to obtain an image of at least a portion of said body irradiated by the neutral particles.

27. The method of claim 26, wherein:
the irradiated body and one of the sensor and the source are movable relative to each other.

28. The method of claim 27, wherein:
the irradiated body offers a thickness of at least two centimeters of metal to the passage of the neutral particles.

29. The method of claim 27, wherein:
the irradiated body has a volume of not less than 1 $m^3$.

30. The method of claim 27, wherein:
the irradiated body is a container.

31. The method of claim 27, wherein:
the neutral particles are selected from a group of particles including X-ray photons, gamma photons and neutrons.

32. The method of claim 26, wherein:
the energy of the neutral particles used lies in the range 25 keV to 2 MeV.

33. The method of claim 26, wherein:
the energy of the neutral particles used lies in the range 350 keV to 750 keV.

* * * * *